United States Patent [19]

Tsugei et al.

[11] Patent Number: 4,696,054
[45] Date of Patent: Sep. 22, 1987

[54] POCKETABLE WIRELESS TRANSMITTER AND RECEIVER

[75] Inventors: Shinji Tsugei; Tomohiro Inoue, both of Nara, Japan

[73] Assignee: Sharp Kabushiki Kaisha, Osaka, Japan

[21] Appl. No.: 876,670

[22] Filed: Jun. 23, 1986

Related U.S. Application Data

[63] Continuation of Ser. No. 561,291, Dec. 14, 1983, abandoned.

[30] Foreign Application Priority Data

Dec. 16, 1982 [JP] Japan ............................ 57-191094[U]

[51] Int. Cl.$^4$ .......................... H04B 1/38; H04B 1/06
[52] U.S. Cl. .................................... 455/89; 455/344; 455/351; 340/825.44
[58] Field of Search ...................... 455/89, 90, 38, 228, 455/351, 344; 340/825–844; 358/263; 179/2 C; 379/37

[56] References Cited

U.S. PATENT DOCUMENTS

| | | | |
|---|---|---|---|
| 3,944,724 | 3/1976 | Kilby et al. ........................ | 455/351 |
| 3,976,995 | 8/1976 | Sebestyen ............................ | 455/351 |
| 3,995,106 | 11/1976 | Wern et al. ......................... | 358/263 |
| 4,268,721 | 5/1981 | Nielson et al. ...................... | 179/2 C |
| 4,306,294 | 12/1981 | Hashimoto et al. ................. | 455/344 |
| 4,336,524 | 6/1982 | Levine ............................ | 340/825.44 |
| 4,477,807 | 10/1984 | Nakajima et al. .................... | 455/38 |

FOREIGN PATENT DOCUMENTS 2622305  5/1956  Fed. Rep. of Germany ........ 455/89

OTHER PUBLICATIONS

Winston; "How to Get On 6 Meters," October, 1981.
Resco, "Emergency Location Altering System," Aug. 1979, p. 2.
Goodman, "The Radio Amateur's Handbook," 1966.

Primary Examiner—Robert L. Griffin
Assistant Examiner—Curtis Kuntz
Attorney, Agent, or Firm—Birch, Stewart, Kolasch & Birch

[57] ABSTRACT

A wireless communicating device comprises a receiving circuit for wirelessly receiving message serial number information and a display for displaying the message serial number information. Preferably and additionally, the device may comprise a transmission circuit for wirelessly transmitting the message serial number, preferably, repetitively.

5 Claims, 6 Drawing Figures

POCKETABLE WIRELESS TRANSMITTER AND RECEIVER

This application is a continuation, of application Ser. No. 561,291 filed on Dec. 14, 1983, now abandoned.

BACKGROUND OF THE INVENTION

The present invention relates to a wireless transmitter and receiver, and more particularly, to a pocketable wireless transmitter and receiver.

The conventional pocketable wireless device marketed can only receive the wireless information and generate a call sound without indicating that the received wireless information means any specific instruction. For the receiving person to confirm the specific instruction, he must ask for the specific instruction, for example, by telephoning. That is, the conventional wireless receiver cannot inform the operator of the meaning of the wireless information.

Therefore, it is desired to provide am improved wireless device for receiving the wireless messages and informing the operator of the meaning of the wireless messages.

SUMMARY OF THE INVENTION

Accordingly, it is an object of the present invention to provide an improved wireless device for receiving wireless message and informing the operator of the meaning of the wireless message.

It is another object of the present invention to provide an improved portable wireless device for receiving wireless message and informing the operator of the meaning of the wireless message.

It is a further object of the present invention to provide an improved wireless device for receiving wireless message to provide a call sound and informing the operator of the meaning of the wireless message.

Briefly described, in accordance with the present invention, a wireless receiver, preferably, pocketable, comprises a receiving means for receiving a message serial number, and a display for displaying the message serial number. Further, the receiver may comprise a transmission means for transmitting the message serial number.

BRIEF DESCRIPTION OF THE DRAWINGS

The present invention will become more fully understood from the detailed description given hereinbelow and the accompanying drawings which are given by way of illustration only, and thus are not limitative of the present invention and wherein.

DESCRIPTION OF THE INVENTION

Figure 1:
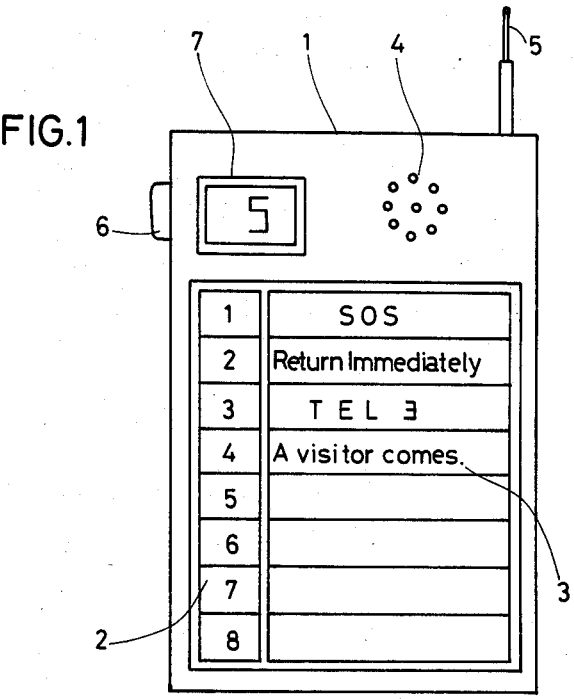
FIG. 1 shows a front view of a pocketable wireless transmitter and receiver according to the present invention.

FIG. 1 shows a front view of a wireless transmitter and receiver according to the present invention. Preferably, the device of FIG. 1 is pocketable. It is essential that a feature for receiving a wireless message must be enabled by the wireless device of FIG. 1. Preferably and additionally, this device may enable another feature for transmitting the wireless message. For the description presented hereinafter, the device of FIG. 1 enables both receipt and transmission of mesages.

Referring now to FIG. 1, the device 1 of FIG. 1 comprises a message serial number keyboard 2, a message memo sheet 3, a buzzer 4, an extensible antenna 5, a transmission switch 6, and a display 7.

The message number keyboard 2 has a plurality of key switches, for example, "1" to "8" as shown vertically in FIG. 1, each actuated to assign a specific message serial number to a specific wireless message. The message memo sheet 3 is positioned at the side of the keyboard 2, so that at each side of the key switches, the column sections of the message memo sheet 3 are aligned.

The buzzer 4 serves to provide a call sound in response to receipt of the wireless message. The transmission switch 6 is actuated to transmit the wireless message. The display 7 is provided for displaying the serial number of the received wireless message. Preferably, the display 7 is a liquid crystal display.

Figure 2:
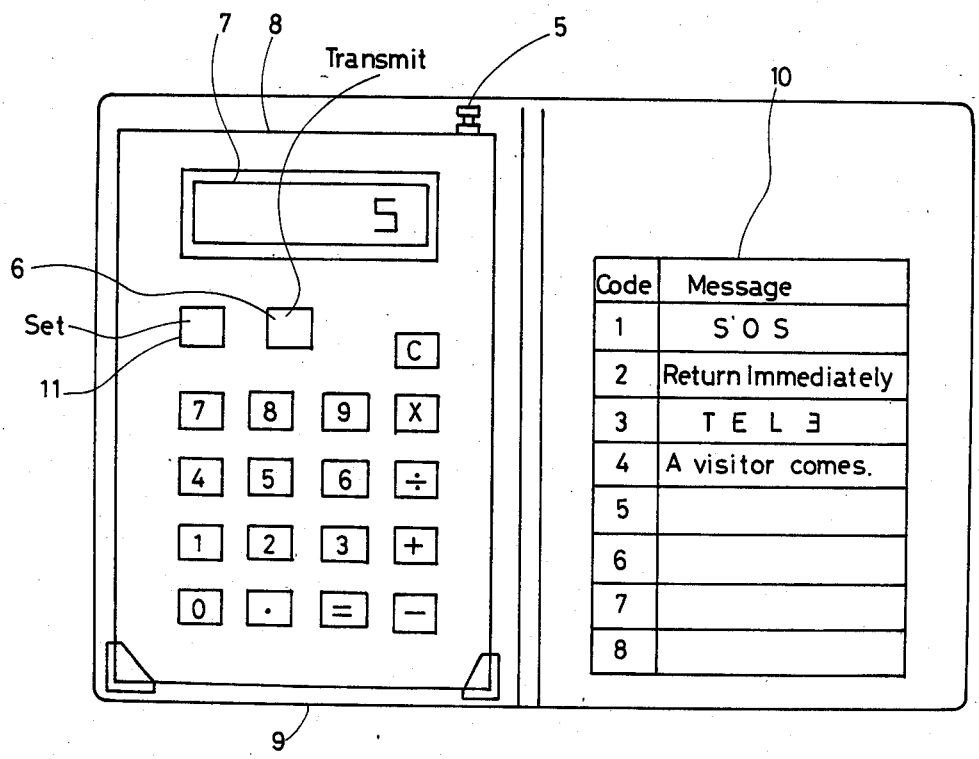
FIG. 2 shows a front view of an electronic calculator integrated with the pocketable wireless transmitter and receiver of FIG. 1.

FIG. 2 shows a front view of a calculator integrated with the wireless transmitter and receiver of FIG. 1. Thus, the device of FIG. 2 can serve as a calculator during a calculator mode and the wireless transmitter and receiver like that of FIG. 1 during a wireless communication mode. Preferably, the calculator of FIG. 2 is contained in a wallet 9.

Referring now to FIG. 2, the calculator 8 is positioned at the left side of the wallet while a table sheet 10 for the serial numbers and the messages is positioned at the right side. In addition to the extensible antenna 5, the transmission switch 6, and the display 7, a set switch 11 is actuated to set a user code.

The display 7 can display the results of a calculation in the calculator mode and the message serial number in the wireless communication mode. The user code set by the set switch 11 prevents malfunction due to the crosstalk in the wireless communication.

The user code is common between a first comminicating transmitter and receiver for transmitting the wireless message and a second communicating transmitter and receiver for receiving the wireless message. When the user code set for the the first communicating wireless device meets with the user code for the second communicating wireless transmitter and receiver, the call sound is generated to show the receipt of the wireless message, so that the serial number of the wireless message is displayed. The structure of the first and second communicating wireless transmitters and receivers is identical.

Of cource, it may be possible that the user code has been fixed. But, it is preferable that the set switch 11 is provided for altering the user code. To set the user code, after some numeral keys in the keyboard of the calculator are actuated, the set switch 11 is actuated. To set a specific user code "10", the numeral keys "1" and "0" and, further, the set switch 11 are all actuated.

Figure 3:
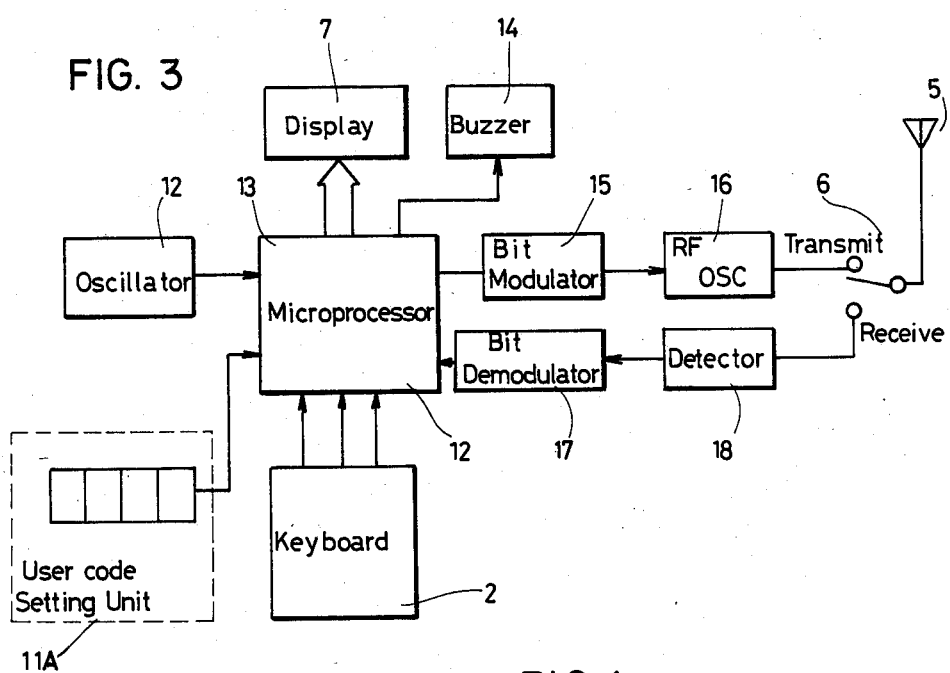
FIG. 3 shows a block diagram of a circuit implemented within the combined calculator and wireless transmitter/receiver of FIG. 2.

FIG. 3 shows a block diagram of a circuit implemented within the device of FIG. 2 for the wireless communication mode.

Referring now to FIG. 3, the circuit comprises the keyboard 2, the extensible antenna 5, the transmission switch 6, the display 7, a reference oscillation circuit 12, a microprocessor 13, a buzzer circuit 14, a bit modulator 15, an RF oscillator 16, a bit demodulator 17, and a detector 18. In place of the keyboard 2 including the set switch 11, a user code setting unit 11A may be provided in which some depression switches are provided for previously setting the user code. Preferably, the depression switches may be of four digits corresponding to the binary coded decimal codes. In such a case, for example, to set the user code of "10", the first and third digit keys of the depression switches are depressed while the second and fourth digit keys thereof are not depressed.

The reference oscillation circuit 12 serves to provide clock signals for activating the microprocessor 13. The microprocessor 13 controls the transmission and receipt of the wireless message, the providing of a call sound, the displaying of the message, the detection of the key input operation, and the setting of the user code.

The bit modulator 15 modulates the bit serial signals developed by the microprocessor 13 into tone burst wave forms to be transmitted. The bit modulator 15 and the RF oscillator 16 form a transmission circuit.

The bit demodulator 17 is provided for demodulating the tone burst wave forms to the bit serial signals. The bit demodulator 17 and the detector 18 form a receiver circuit. The connection of each of the transmission circuit and the receiver circuit to the antenna 6 is selected by the transmission switch 6.

Figure 4:
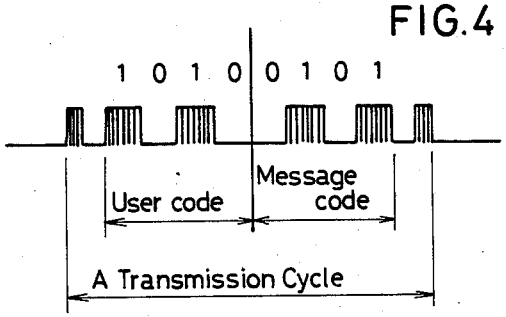
FIG. 4 shows a diagram of a transmission cycle used for the circuit of FIG. 3.

FIG. 4 shows a single transmission cycle of the user code signals and the message code signals.

The single transmission cycle includes a start signal, the user code signals, the message code signals, and the end signal.

Figure 5:
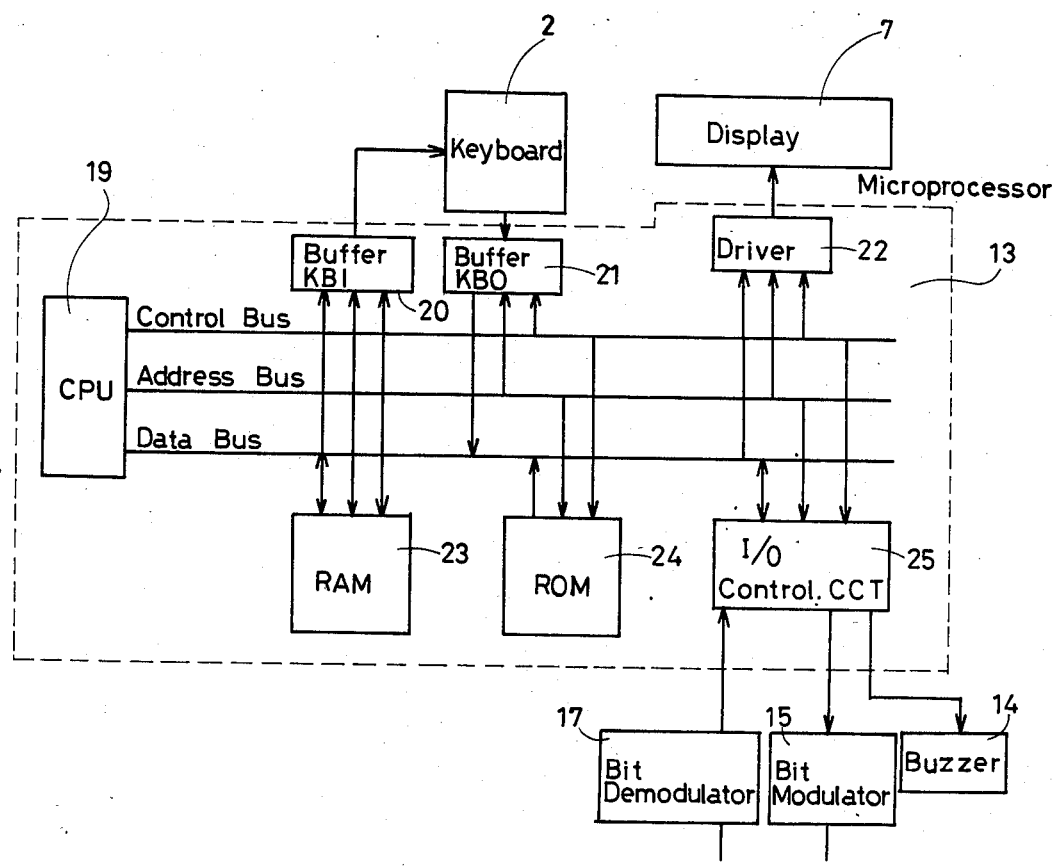
FIG. 5 shows a block diagram of a microprocessor in the circuit of FIG. 3.

FIG. 5 shows a block diagram of the microprocessor 13 of FIG. 3.

Referring now to FIG. 5, the microprocessor 13 comprises a central processing unit (CPU) 19, a key strobe signal buffer (KBI) 20, a key signal buffer (KBO) 21, a driver 22, a random access memory (RAM) 23, a read only memory (ROM) 24, an input and output (I/O) control circuit 25.

To the keyboard 2, the KBI buffer 20 and the KBO buffer 21 are connected. The KBI buffer 20 is provided for buffering the key strobe signals. The KBO buffer 21 is provided for buffering the key input signals. The driver 22 is connected to the display 7 for controlling to display. The I/O control circuit 25 is connected to the bit modulator 15 for outputting the bit serial signals applied to it. This I/O control circuit 25 is also connected to the bit demodulator 17 for inputting the bit serial signals demodulated by it. Further, the I/O control circuit 25 is connected to the buzzer circuit 14 to output the buzzer signal.

As will be described with reference to FIG. 6, the RAM 23 serves as X and Y registers to store data for the operation, and a counter N for counting while the ROM 24 stores a control program for the operation.

To the CPU 19, a control bus, an address bus, and a data bus are connected to control the KBI buffer 20, the KBO buffer 21, the driver 22, the RAM 23, the ROM 24, and the I/O control circuit 25.

Figure 6:
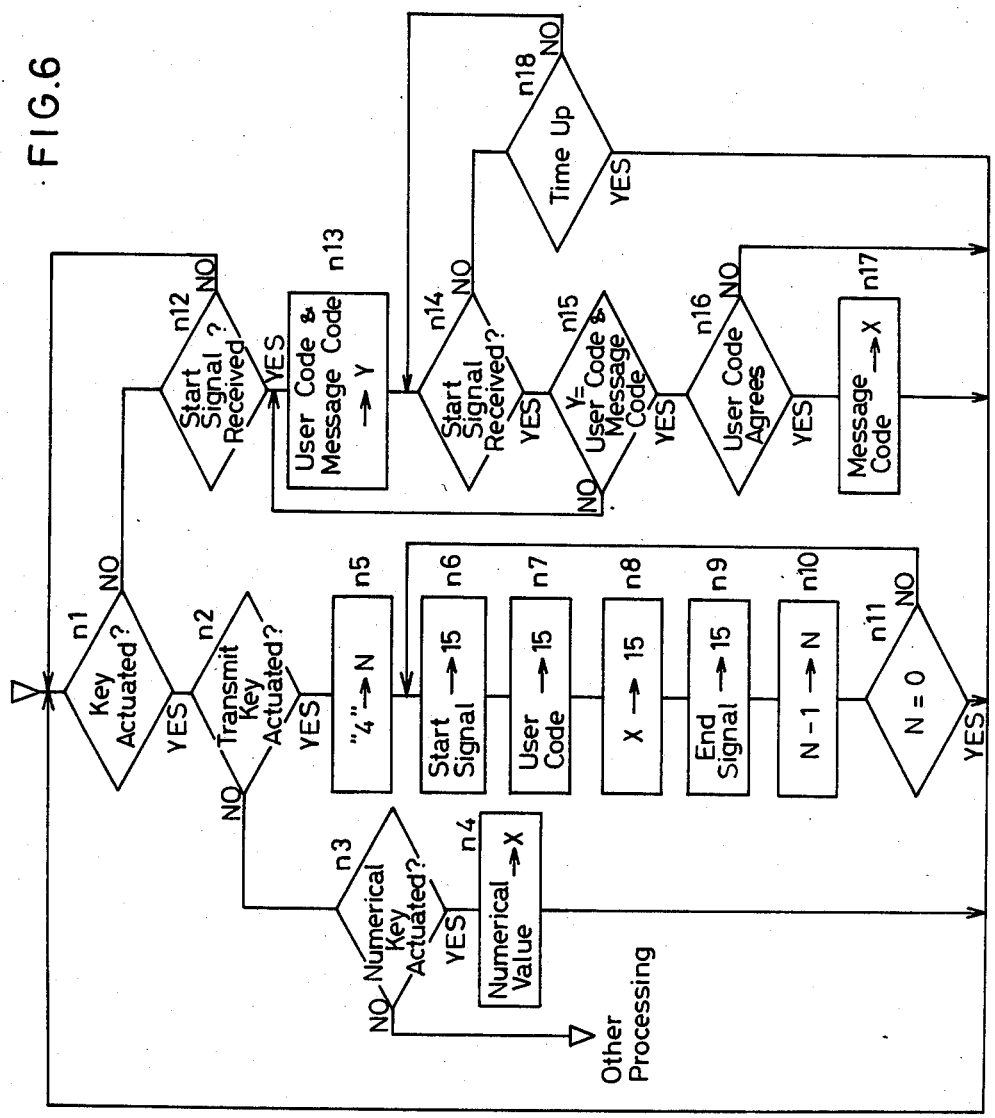
FIG. 6 shows a flow chart of the operation of the combined calculator and wireless transmitter/receiver of FIG. 2.

FIG. 6 shows a flow chart of the operation based on the program as stored in the ROM 24. The respective steps of the flow chart of FIG. 6 are as follows:

Steps n1–n4: It is detected whether any key input is made. If any numeral key is actuated, the corresponding numeral data are stored into the X register within the RAM 23. Unless the transmission switch 6 is actuated, the device continues to serve in the calculator mode.

Steps n2–n5: When the transmission switch 6 is actuated to select the wireless communication mode, a specific constant, for example, "4" is inputted into the counter N within the RAM 23. The specific constant is set in the counter N to define the repetitive number by which the communication operation is repeated.

If desired, a mode switch may be provided for selecting either of the calculator mode and the wireless communication mode.

Steps n6–n9: The bit modulator 15 in turn receives the start signal, the user code, the message code stored within the X register, and the end signal. The message code in the X register is different from the numeral data as stored in the X register in step n4. The message code used in the circuit of FIG. 3 represents the message serial number.

Step n11: The operation at steps n6–n9 is repeated four times before the contents of the counter N become "0". Thus, any desired wireless message is transmitted.

Steps n12–n13: In response to receipt of the start signal, the received user code and the message code are transferred from the bit demodulator 17 to the Y register within the RAM 23.

Steps n14–n16: In response to the next start signal, the following user code and the message code are also accepted to determine whether the contents of the user code and the message code meet with the contents of the Y register storing the previous user code and message code. If they do not agree, the input of the user code and message code is repeated once more to detect whether they meet with the stored contents.

When the received user code and message code meet with the previously stored contents, it is detected whether the received user code meets with the user code peculiar to the present receiver. If they agree, the X register inputs the received message code to display them as the message directed to itself.

Step n18: If the receiver fails to receive the start signal in step n14 for a predetermined time, the receiving operation ends since it is assumed that this failure is caused by the crosstalk or the like.

According to the present invention, some specific meanings of the wireless messages have been previously defined between the first and second communicating transmitters and receivers. The thus defined specific meanings of the messages are written on the message memo sheet 3 of FIG. 1 and the message table 10 of FIG. 2. When, at the transmitting device, a specific message serial number key is actuated, the receiving device receives the transmitted wireless messages two or more times to prevent communication errors. The receiving device assumes that it recived the correct message directed to itself if the first received message agrees with the secondly received message. When the user codes agree, the buzzer circuit 14 is activated to generate the call sound and display the message serial number at the display 7. Simultaneously with the generation of the call sound, the operator can detect that the displayed message serial number refers to the presently received message. He reads the items in the message memo sheet 3 or the message table 10. With the help of the message serial number, the operator can detect the meaning of the message.

The above described transmitter and receiver of the present invention is more advantageous than the displaying or voice synthesizing the meaning of the message directly because the circuit of the present invention becomes simpler and the display becomes more compact.

While only certain embodiments of the present invention have been described, it will be apparent to those skilled in the art that various changes and modifications may be made therein without departing from the sprit and scope of the present invention as claimed.

What is claimed is:

1. A wireless communicating device for wirelessly communicating message codes representative of specific messages with one of a plurality of additional communicating devices, comprising:

an antenna;

demodulator means, connected to said antenna, for detecting and demodulating a transmission received by said antenna on a predetermined frequency band, said demodulator means converting said transmission into a bit pulse train;

said bit pulse train comprising a start bit, a binary user code specifying a particular said communicating device selected to recognize said transmission, a binary message code, and a stop bit;

means for selecting a desired user code for said wireless communicating device;

means for displaying a decimal representatio of a detected message code;

processor means, operatively connected to said demodulator means, said means for selecting and said means for displaying, for receiving said bit pulse train, for detecting a coincidence between said binary user code of said bit pulse train and said desired user code selected by said means for selecting, and for supplying said message code of said bit pulse train to said means for displaying in response to the detected coincidence;

keyboard means for introducing a desired message code to be transmitted;

said processor means being responsive to said keyboard and developing a said bit pulse train for transmission to a selected additional communicating device, said bit pulse train including a binary user code of the selected additional communicating device to receive said bit pulse train;

bit modulator means responsive to said processor means for modulating said bit pulse train into a tone burst waveform; and oscillator means, operatively connected to said bit modulator means, for converting said tone burst waveform into a transmission, said oscillator means supplying said transmission to said antenna;

said processor means repeatedly supplying said bit pulse train to said bit modulator means and oscillator means to repetitively transmit said transmission when said device is in a transmitting mode, said processor means supplying said message code to said means for displaying only after detecting said bit pulse train received by said device a predetermined repeated number of times when in a receiving mode.

2. The device of claim 1 wherein said means for selecting may further select a binary user code of a said additional communicating device to which a desired message is to be transmitted.

3. The device of claim 1 further comprising means for selecting between the transmitting mode and the receiving mode, said means for selecting operatively connecting said demodulator means to said antenna in said receiving mode and operatively connecting said oscillator means to said antenna in said transmitting mode.

4. The device of claim 3 further comprising sound generation means, operatively connected to said processor means for control thereby, for developing an audible call sound upon detection of a coincidence between said binary user code of said bit pulse train and said desired user code.

5. The device of claim 1 further comprising:

calculator means operatively connected to said keyboard means and means for displaying, for performing mathematical calculations when in a calculation mode;

said keyboard means further introducing information to be calculated into said calculator means and said means for displaying displaying results of said mathematical calculations when said device is in a calculation mode and;

means for selecting between the calculation mode and a communication mode wherein said device transmits or receives said bit pulse trains.

* * * * *